United States Patent
Lin et al.

(10) Patent No.: US 7,799,861 B2
(45) Date of Patent: Sep. 21, 2010

(54) CNT/POLYMER COMPOSITE AND METHOD FOR PRODUCING THE SAME

(75) Inventors: Kuan-Jiuh Lin, No. 108, Hsin-Hua Street, Taichung City (TW); Jun-Wei Su, Chia-Yi (TW)

(73) Assignee: Kuan-Jiuh Lin, Taichung (TW)

( * ) Notice: Subject to any disclaimer, the term of this patent is extended or adjusted under 35 U.S.C. 154(b) by 160 days.

(21) Appl. No.: 11/472,699

(22) Filed: Jun. 21, 2006

(65) Prior Publication Data
US 2007/0067881 A1 Mar. 22, 2007

(30) Foreign Application Priority Data
Jun. 23, 2005 (TW) .............................. 94120961 A

(51) Int. Cl.
| | |
|---|---|
| C08K 7/02 | (2006.01) |
| C08K 5/04 | (2006.01) |
| C08K 3/04 | (2006.01) |
| C08K 9/04 | (2006.01) |
| B01J 8/16 | (2006.01) |
| C08L 29/02 | (2006.01) |

(52) U.S. Cl. .................. 524/495; 524/496; 524/557; 977/734; 977/742; 977/750; 977/752; 977/753; 523/300

(58) Field of Classification Search ................ 524/495, 524/496, 557; 252/500; 523/300; 977/734, 977/742, 750, 953, 752
See application file for complete search history.

(56) References Cited

U.S. PATENT DOCUMENTS

| | | | | |
|---|---|---|---|---|
| 5,437,804 | A | * 8/1995 | Yamamoto | .................. 252/62.2 |
| 7,056,452 | B2 | * 6/2006 | Niu et al. | ..................... 252/511 |
| 2003/0102585 | A1 | * 6/2003 | Poulin et al. | .................. 264/11 |
| 2006/0099135 | A1 | * 5/2006 | Yodh et al. | ............... 423/447.1 |

OTHER PUBLICATIONS

Zhang, Xiefei , Tao Liu, T. V. Sreekumar, Satish Kumar, Valerie C. Moore, Robert H. Hauge, and Richard E. Smalley. Poly(vinyl alcohol)/SWNT Composite Film. Aug. 15, 2003, Nano Letters, vol. 3 (9), p. 1285-1288.*

Rozhin, Aleksey G, Youichi Sakakibara, Madoka Tokumoto, Hiromichi Kataura and Yohji Achiba. Near-infrared nonlinear optical properties of single-wall carbon nanotubes embedded in polymer film. Oct. 11, 2004, Thin Solid Films, vol. 464-465, p. 268-372.*

Islam, M. F., E. Rojas, D. M. Bergey, A. T. Johnson, and A. G. Yodh. High Weight Fraction Surfactant Solubilization of Single-Wall Carbon Nanotubes in Water. Nano Letters, vol. 3 (2), p. 269-273.*

O'Connell, Michael J., Sergei M. Bachilo, Chad B. Huffman, Valerie C. Moore, Michael S. Strano, Erik H. Haroz, Kristy L. Rialon, Peter J. Boul, William H. Noon, Carter Kittrell, Jianpeng Ma, Robert H. Hauge, R. Bruce Weisman, Richard E. Smalley. Band Gap Fluorescence from Individual Single-Walled Carbon Nanotubes. Jul. 26, 2002, vol. 297, p. 593-596.*

(Continued)

Primary Examiner—Milton I Cano
Assistant Examiner—Darcy D LaClair
(74) Attorney, Agent, or Firm—Charles E. Baxley

(57) ABSTRACT

The present invention provides a CNT/polymer composite, in which properties of the polymer is modified and improved. The present invention also relates to a method for producing the CNT/polymer composite.

3 Claims, 14 Drawing Sheets

OTHER PUBLICATIONS

O'Connell, Michael J., Peter Boul, Lars M. Ericson, Chad Huffman, Yuhuang Wang, Erik Haroz, Cynthia Kuper, Jim Tour, Kevin D. Ausman and Richard E. Smalley. Reversible water-solubilization of single-walled carbon nanotubes by polymer wrapping. Jul. 13, 2001, vol. 342, p. 265-271.*

Grossiord, Nadia, Joachim Loosbc, and Cor E. Koning. Strategies for dispersing carbon nanotubes in highly viscous polymers. 2005, vol. 15, p. 2349-2352.*

Sigma-Aldrich Product Website. (http://www.sigmaaldrich.com/Area_of_Interest/The_Americas/United_States.html) Provided: the results of a search for SDS product.*

Wako Pure Chemical Industries Catalog Pages. (http://www.e-re-agent.com) Provided: Data for Absorphtiometric grade PVA.*

* cited by examiner

CNT/POLYMER COMPOSITE AND METHOD FOR PRODUCING THE SAME

BACKGROUND OF THE INVENTION

1. Field of the Invention

The present invention relates to a CNT/polymer composite, in which properties of the polymer is modified and improved by the CNT (carbon nanotubes). The present invention also relates to a method for producing the CNT/polymer composite.

2. Related Prior Art

Carbon nanotubes (CNT) play a very important role in modifying traditional materials which perform poor characteristics such as electrical conductivity.

U.S. Pat. No. 7,056,452 discloses "Polyvinylidene fluoride composites and methods for preparing same". The PVDF composites are prepared by dissolving the PVDF polymer in a first solvent to form a polymer solution and then adding the carbon nanotubes into the solution. The solution is mixed using an energy source such as a sonicator or a Waring blender. A precipitating component is added to precipitate out a composite comprising the polymer and the nanotubes. The composite is isolated by filtering the solution and drying the composite.

Though the conductivity is improved in the above disclosure, however, an organic solvent such as ketone or tetrahydrofuran has to be uses and thus may result in pollution. In addition, the post-treatment to isolate the composite is complex.

Accordingly, it's desired to develop a technology of modifying polymers with the CNT and thus improve characteristics thereof.

SUMMARY OF THE INVENTION

The main object of the present invention is to provide a CNT/polymer composite and a method for producing the same, so that the polymer can be modified with CNT and characteristics thereof can be improved.

In the present invention, the method for producing the CNT/polymer composite comprises a step of: mixing CNT, polymers and a surfactant in water with high-speed oscillation to form a CNT/polymer composite solution.

Preferably, the CNT and the surfactant are previously mixed in water to form a CNT dispersion, and then the polymer is mixed therein. More preferably, the surfactant is previously dissolved in water to form a solution of the surfactant, and then the CNT is mixed in the solution to form the CNT dispersion.

The surfactant used in the present invention is preferably an anionic surfactant, for example, alkyl sulfonate, alkyl benzene sulfonate, alkyl sulfate or alkyl benzene sulfate. More examples of the anionic surfactant include sodium hexyl sulphonate, sodium heptyl sulphonate, sodium oxtyl sulphonate, sodium dodecyl sulphonate, sodium nonadecyl sulphonate, sodium eicosyl sulphonate, sodium hexyl benzene sulphonate, sodium heptyl benzene sulphonate, sodium oxtyl benzene sulphonate, sodium dodecyl benzene sulphonate, sodium nonadecyl benzene sulphonate, sodium eicosyl benzene sulphonate, calcium hexyl sulphonate, calcium heptyl sulphonate, calcium oxtyl sulphonate, calcium dodecyl sulphonate, calcium nonadecyl sulphonate and calcium eicosyl sulphonate. Among these surfactants, sodium dodecyl sulphonate (SDS) is preferred, which preferably has a concentration about 1~0.1 wt % in the aqueous solution; and the weight ratio of SDS:CNT is preferably 0.1:1~100:1, more preferably 0.2:1~5:1.

In the present invention, the polymer for modified can be any proper polymers, and preferably has a molecular weight ranging 1,000~4,000,000 and is selected from the group consisting of:

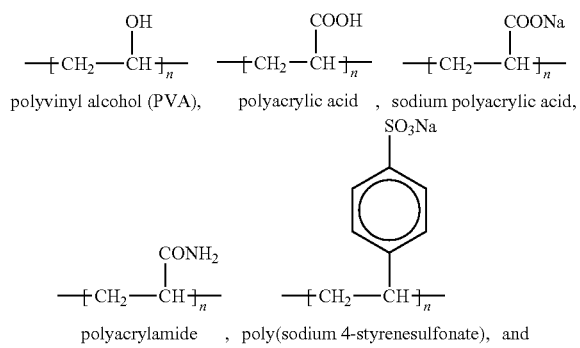

polyvinyl alcohol (PVA), polyacrylic acid, sodium polyacrylic acid, polyacrylamide, poly(sodium 4-styrenesulfonate), and a mixture of polyvinyl alcohol and borax ($Na_2B_4O_7$) in a molar ratio of 1:1;

wherein n is an integer larger than 1.
and more preferably polyvinyl alcohol (PVA). Preferably, the weight ratio of PVA:CNT ranges 1.5:1~10,000:1, and the molecular weight of PVA preferably ranges 1,000~200,000.

The CNT/polymer composite solution obtained in the above procedure can be further dried to form a solid CNT/polymer composite.

Preferably, the mixing procedure is operated in an ultrasonic oscillator, and preferably operated intermittently and/or in a probe-type ultrasonic oscillator.

DETAILED DESCRIPTION OF THE PREFERRED EMBODIMENTS

Figure 1:
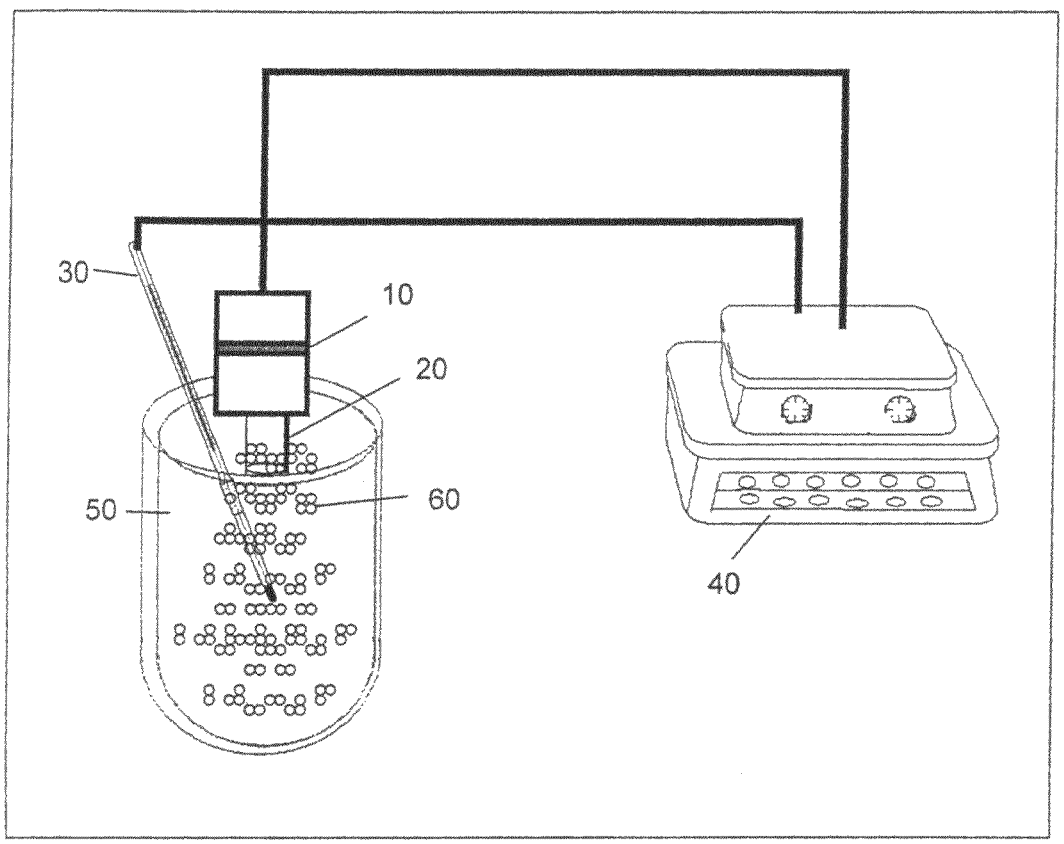
FIG. 1 shows a probe-type ultrasonic oscillator used in the embodiments.

To clearly describe the present invention, procedures of some preferred embodiments are exemplified with the drawings. FIG. 1 shows a probe-type ultrasonic oscillator for mixing CNT, a surfactant and polymers, which includes an oscillator 10, a Ti probe 20, a controller 30 and a thermocouple 40. Once the oscillator starts, the solution 50 will generate bubbles 60.

In the Examples and Comparative Examples, Sodium dodecyl sulphonate (SDS) and polyvinyl alcohol (PVA) are respectively used as the surfactant and polymers to be modified.

Example 1

(a) Preparing the CNT Dispersion

SDS (50 mg) is dissolved in water to form an aqueous solution (50 mL) and then added into a round-bottom tube in which CNT (12.5 mg) is contained. These materials are then mixed with a probe-type ultrasonic oscillator for 120 minutes to form a CNT dispersion. Operation conditions of the oscillator are as follows:
Frequency: 20 KHz
rated power: 750 W
operation strength: 20%~40%
temperature: 25° C.

The mixture is then cooled to room temperature and a uniform CNT dispersion is achieved.

(b) Modifying the Polymer

PVA (12.5 g, molecular weight (m.w.) 18,000~20,000) is dissolved in water to form a 10 wt % solution into which the CNT dispersion is then added and agitated in the ultrasonic oscillator for 3 minutes, and finally a uniform CNT/PVA composite solution with a weight ratio of PVA:CNT=1,000:1 (or 10,000:10) is obtained.

(c) Forming a CNT/PVA Composite Film

The CNT/PVA composite solution is then coated on a substrate with the dip-coating method, and dried in an oven to form a CNT/PVA composite film.

Examples 2~5

The procedures of Example 1 are repeated, but different amounts of the PVA solution are added to obtain solutions with weight ratios of PVA:CNT=10,000:1, 10,000:2, 10,000:3 and 10,000:5.

Example 6

The procedures of Example 1 are repeated, but the PVA (12.5 g) is added into water together with SDS.

Examples 7~9

The procedures of Example 1 are repeated, but PVA (m.w. 6,000~8,000), PVA (m.w. 60,000) and PVA (m.w. 80,000) instead of PVA (m.w. 18,000~20,000) are respectively added.

Examples 10~22

The procedures of Example 1 are repeated, but the CNT, SDS and PVA are added in ratios as listed in Table 1.

TABLE 1

| Examples | CNT | SDS | PVA | CNT (wt %) |
|---|---|---|---|---|
| 10 | 0.001 | 0.01 | 999.989 | 0.0001 |
| 11 | 0.01 | 0.1 | 999.89 | 0.001 |
| 12 | 0.1 | 1 | 998.9 | 0.01 |
| 13 | 1 | 10 | 989 | 0.1 |

TABLE 1-continued

| Examples | CNT | SDS | PVA | CNT (wt %) |
|---|---|---|---|---|
| 14 | 10 | 10 | 980 | 1.0 |
| 15 | 20 | 10 | 970 | 2.0 |
| 16 | 25 | 15 | 960 | 2.5 |
| 17 | 50 | 25 | 925 | 5.0 |
| 18 | 75 | 25 | 900 | 7.5 |
| 19 | 100 | 25 | 875 | 10 |
| 20 | 200 | 50 | 750 | 20 |
| 21 | 300 | 50 | 650 | 30 |
| 22 | 400 | 100 | 500 | 40 |
| 23 | 500 | 100 | 400 | 50 |

Comparative Examples 1

The procedures of Example 1 are repeated, but no SDS is added.

Comparative Example 2

The procedures of Example 1 are repeated, but the probe-type ultrasonic oscillator is replaced with a mechanical agitator and operated for 120 minutes.

Comparative Example 3

The procedures of Example 1 are repeated, but the probe-type ultrasonic oscillator is replaced with a tank-type ultrasonic oscillator and operated for 120 minutes.

Observations of the CNT/PVA Composite Solutions

Figure 2:
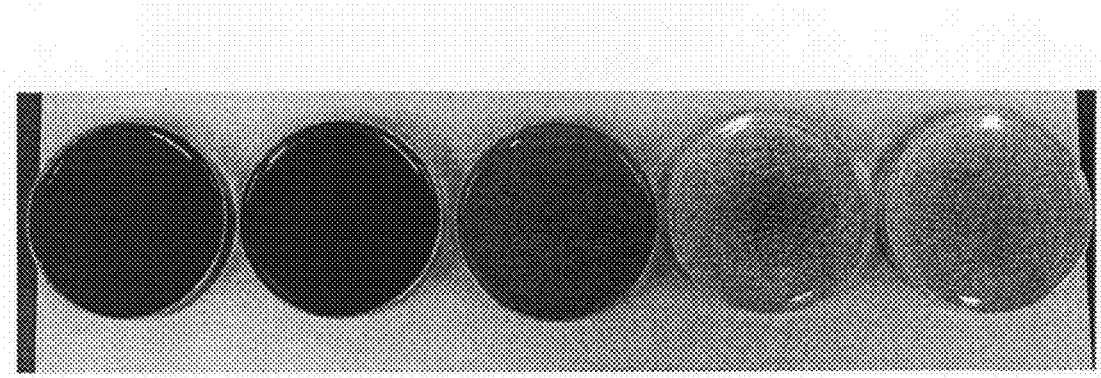
FIG. 2 shows states of the CNT/PVA solutions obtained in Examples 1 & 6, Comparative Examples 1~3.

FIG. 2 shows states of the CNT/PVA solutions obtained in Examples 1 & 6, Comparative Examples 1~3 (respectively marked as A, B, C, D and E); wherein Example 1 performs the best dispersing state. Comparative Examples 1~3, particularly Comparative Examples 2 & 3, present lighter color, i.e., the CNT is hardly dispersed in PVA.

Figure 3:
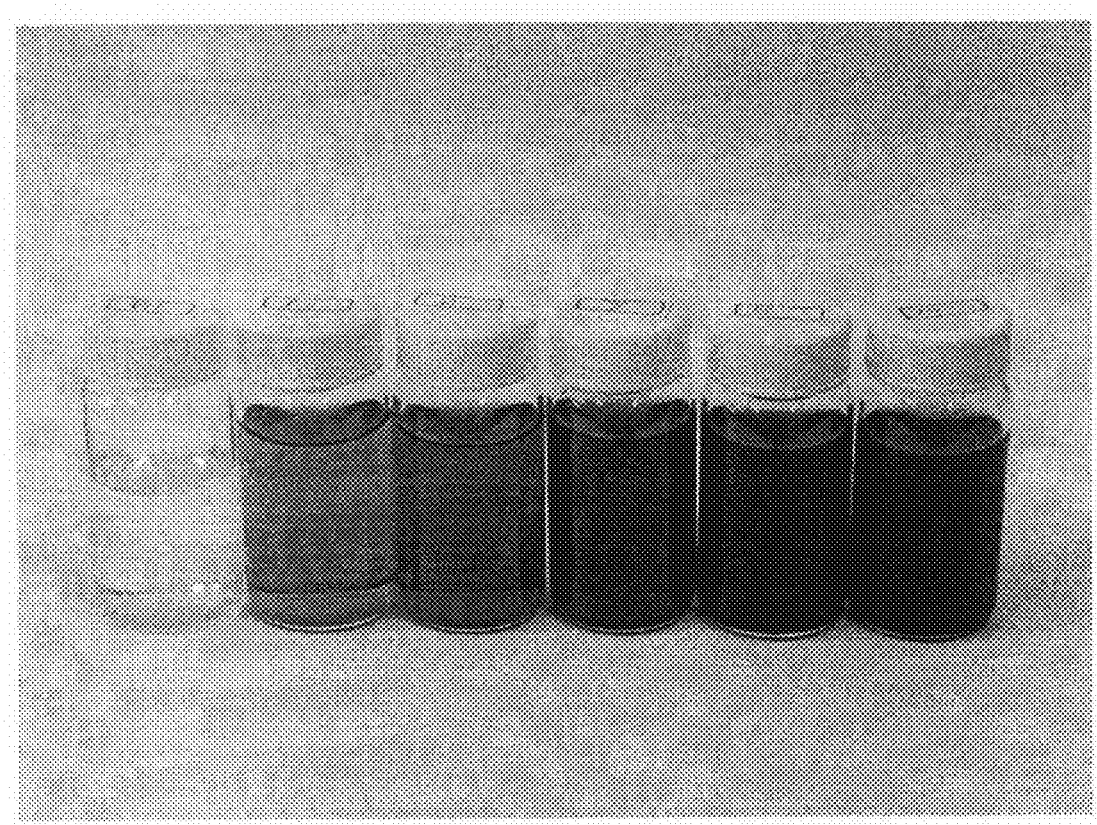
FIG. 3 shows states of the CNT/PVA solutions obtained in Example 1~5.

FIG. 3 shows states of the CNT/PVA solutions obtained in Example 1~5, wherein a pure PVA solution with molecular weight 20,000 is marked as "A" and colors of the solutions become darker with increasing of concentrations.

The CNT/PVA solutions obtained in Examples 7~9 present different viscosities, which indicates that molecular weight of polymers is not restricted as long as amount of water and temperature are properly controlled to be suitable for operation in the probe-type ultrasonic oscillator.

UV Analysis of CNT/PVA Solutions

Figure 4:
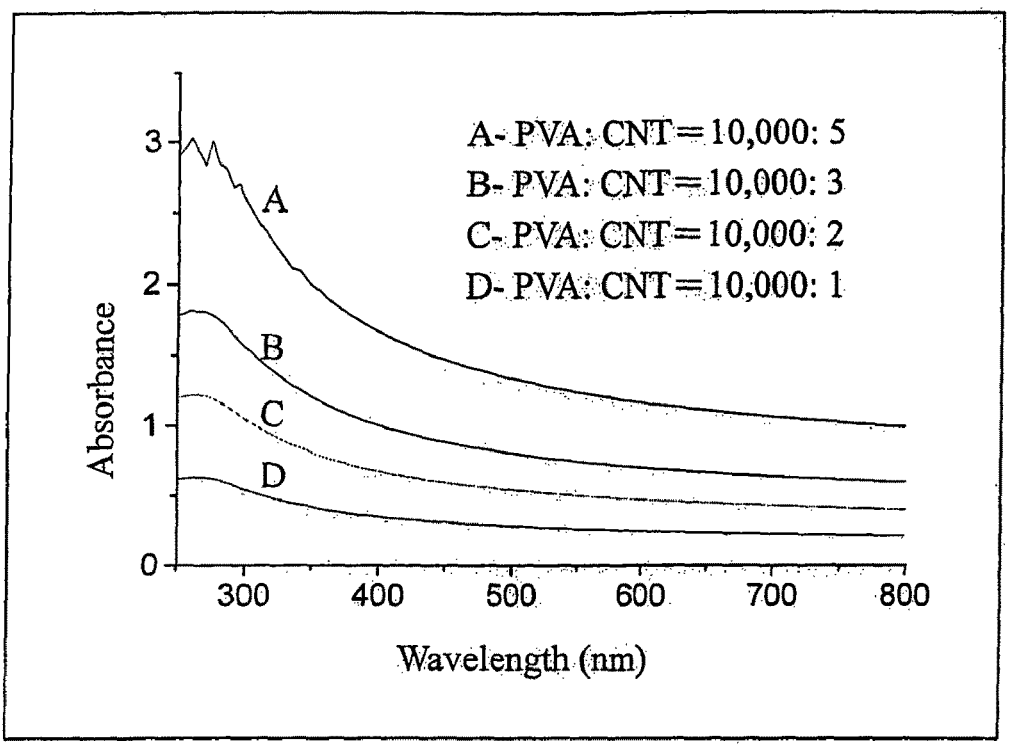
FIG. 4 shows UV absorbance of the CNT/PVA solutions obtained in Examples 2~5.
Figure 5:
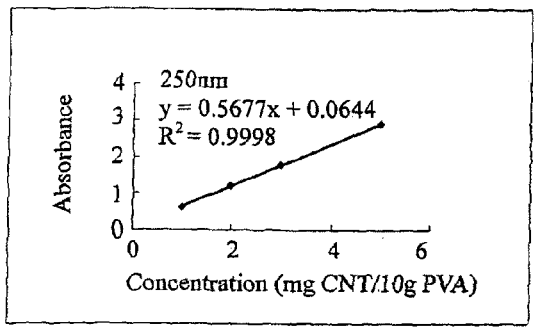
FIGS. 5-10 show linear relationships of UV absorbance and concentrations of the CNT obtained in Examples 2~5.
Figure 6:
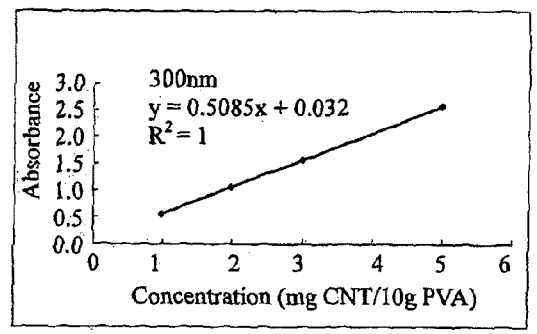
Figure 7:
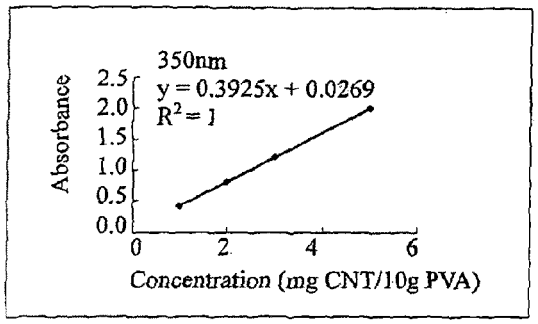
Figure 8:
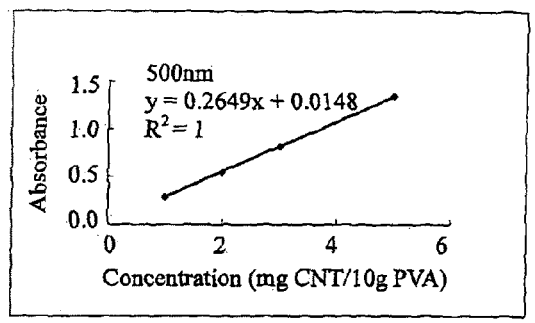
Figure 9:
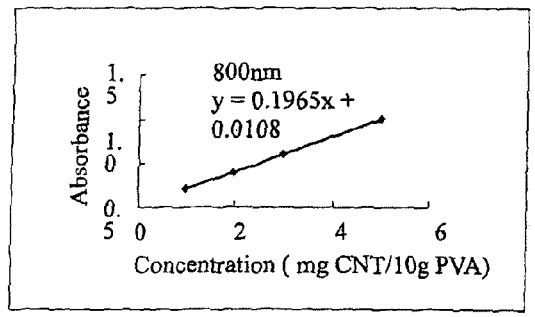
Figure 10:
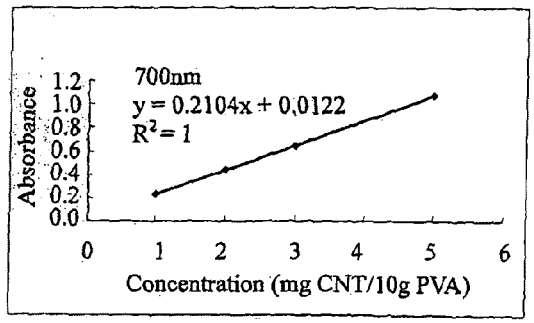

FIG. 4 shows UV absorbance of the CNT/PVA solutions obtained in Examples 2~5, which are almost the same after three months.

FIGS. 5~10 show linear relationships of UV absorbance and concentrations of the CNT obtained in Examples 2~5 at wavelengths 250 nm, 300 nm, 350 nm, 500 nm, 700 nm and 800 nm. As shown in the figures, correlation coefficients (R) are all higher than 0.9998.

SEM Analysis of the CNT/PVA Film

Figure 11:
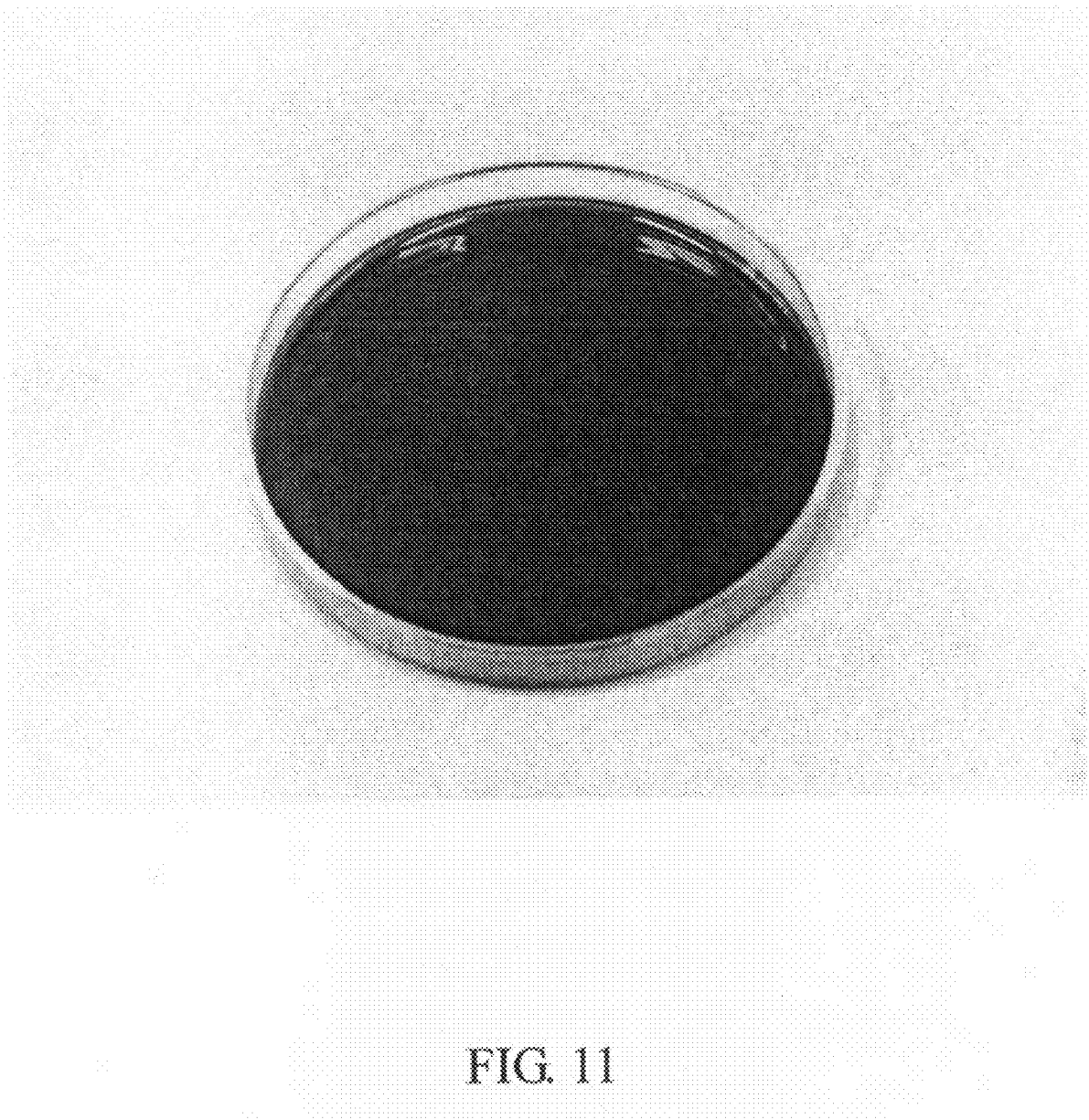
FIG. 11 shows the CNT/PVA film obtained in Example 1.
Figure 12:
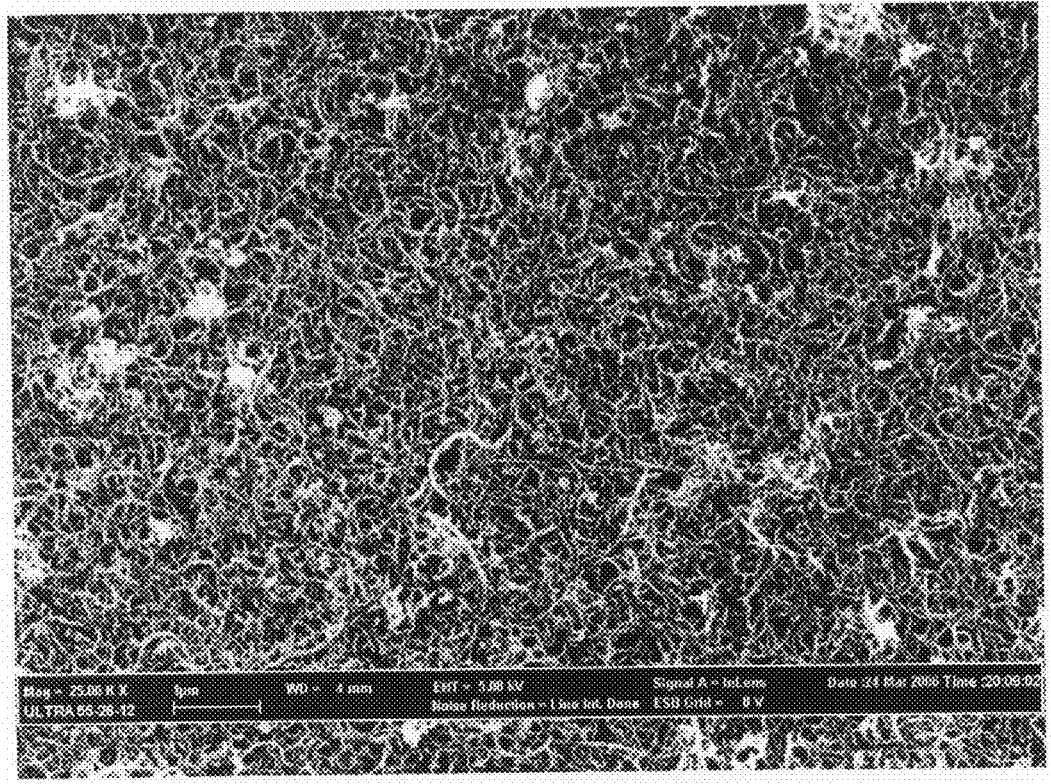
FIGS. 12 and 13 show SEM pictures of the film.
Figure 13:
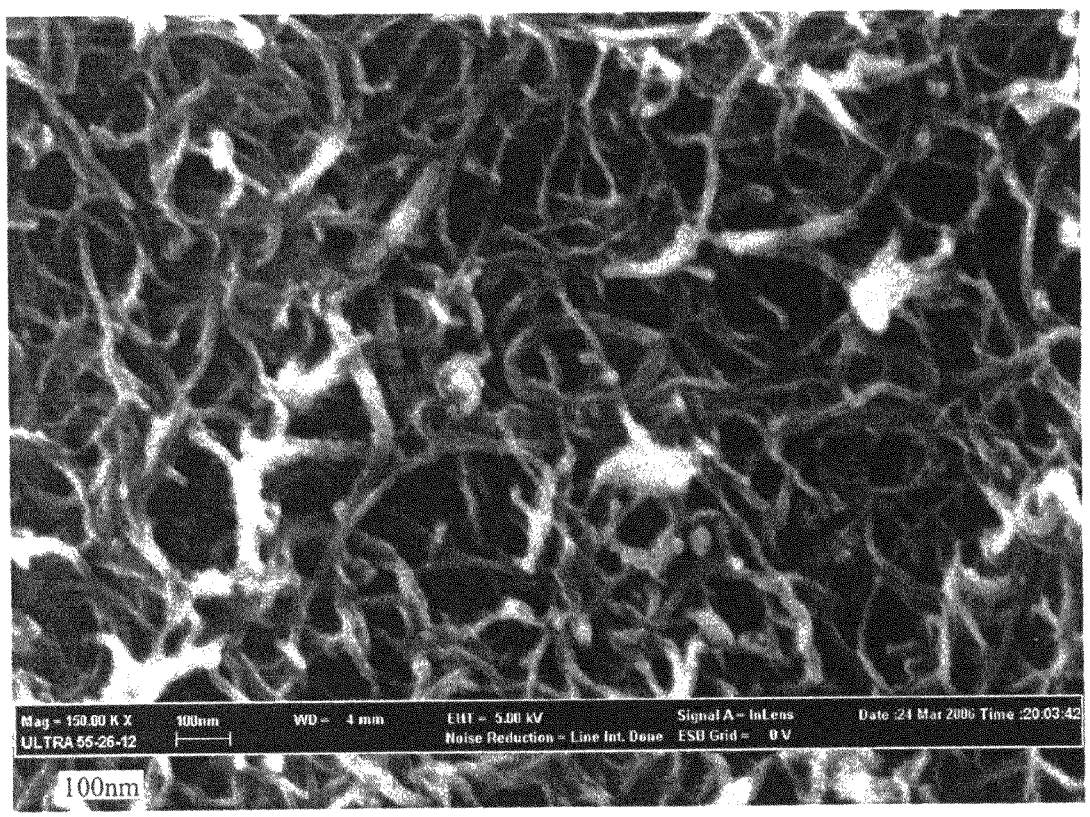

FIG. 11 shows the CNT/PVA film obtained in Example 1. FIGS. 12 and 13 show SEM pictures of the film in different magnifications, wherein the film is etched with plasma and both figures indicate that the CNT is indeed uniformly distributed in PVA.

Figure 14:
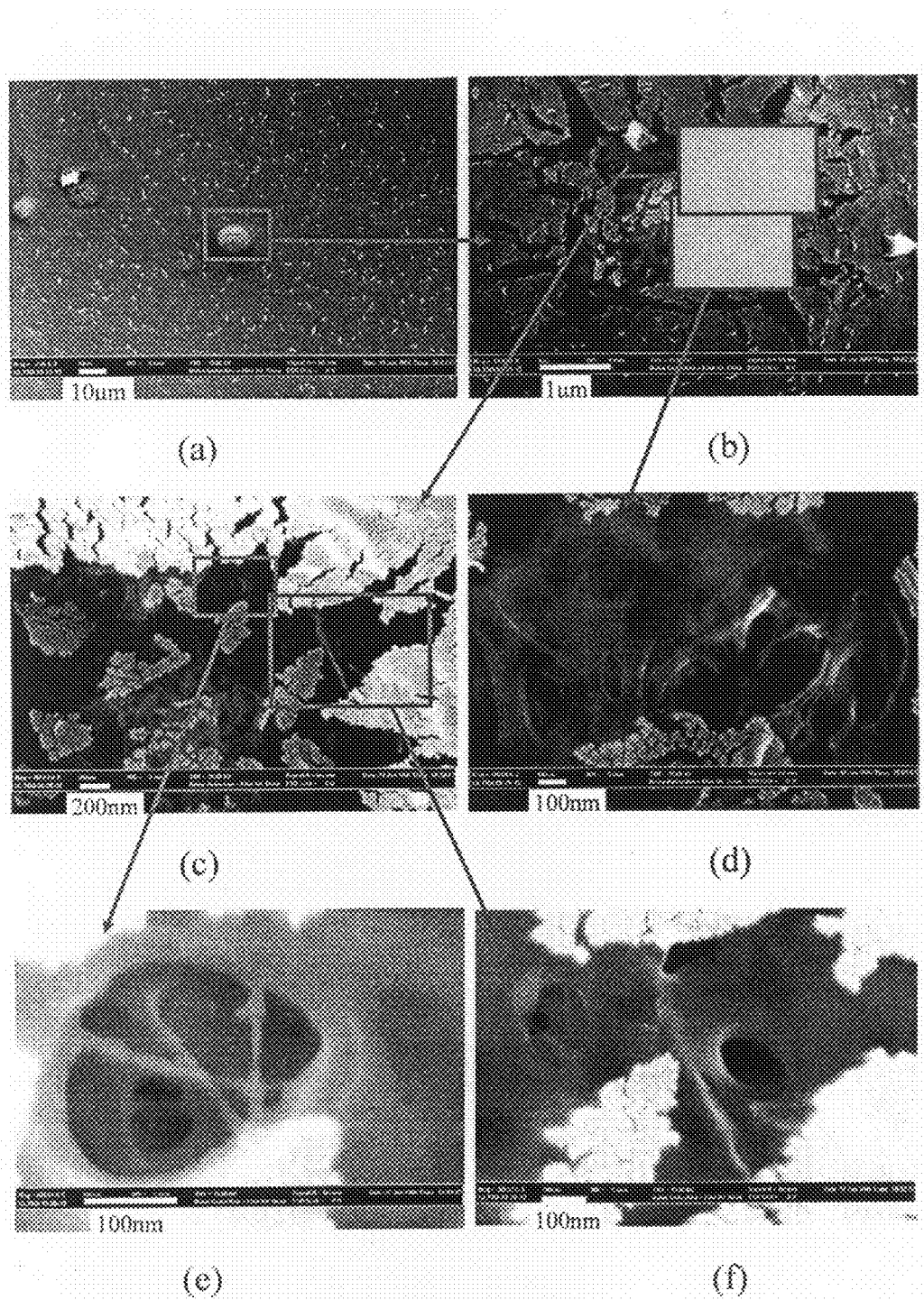
FIG. 14 shows SEM pictures of the film etched with plasma after forming an Au film by sputtering deposition.

FIG. 14 shows SEM pictures of the film etched with plasma after forming an Au film by sputtering deposition, in which (a)~(f) have different magnifications. The protrusion on the center of picture (a) indicates where the electron beams with high energy (15 kV) focus on and burns into the polymer to expose the CNT (lines as shown in the figure).

Electricity Analysis

Figure 15:
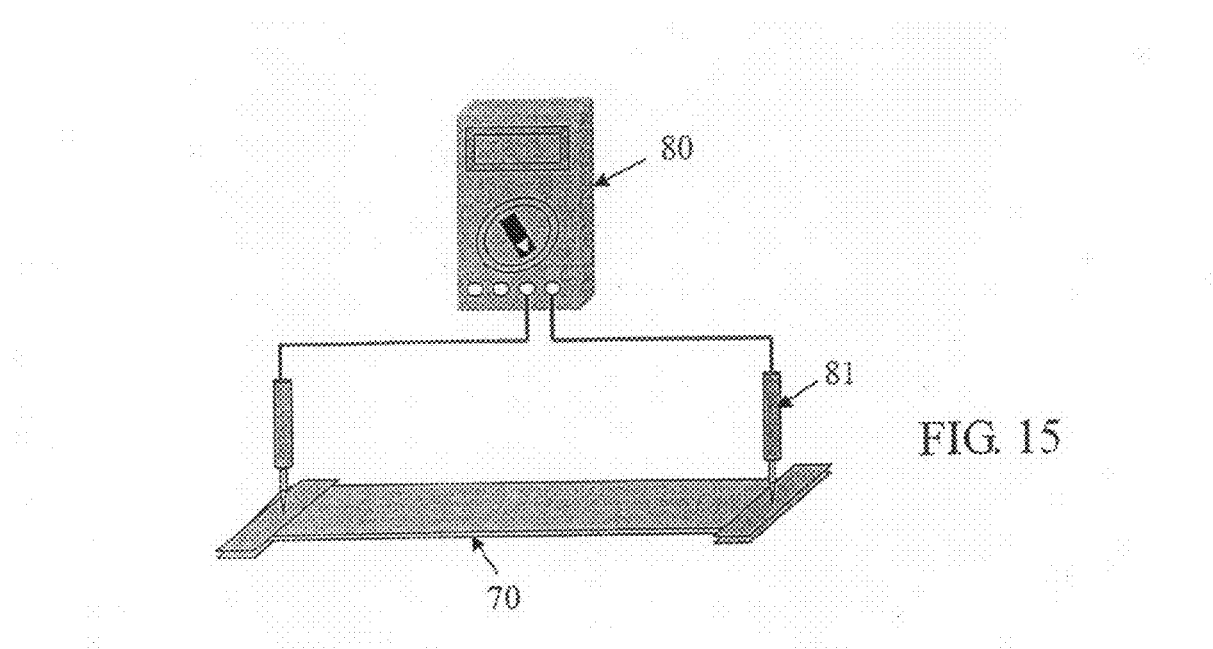
FIG. 15 shows a scheme for measuring resistance of the CNT/PVA film.

FIG. 15 shows a scheme for measuring resistance of the CNT/PVA film weighing 3.2 mg and sizing 2.5 cm×7.5 cm. An equation as follows is applied.

$$R = \frac{1}{\sigma} \times \frac{L}{A}$$

wherein R is resistance (Ω), σ is electrical conductivity, A is cross area, and L is the length. The resistance of the film is calculated as 4.481 MΩ, which indicates that merely some CNT obtained in the present invention can modify insulated polymers to conductive polymers.

Figure 16:
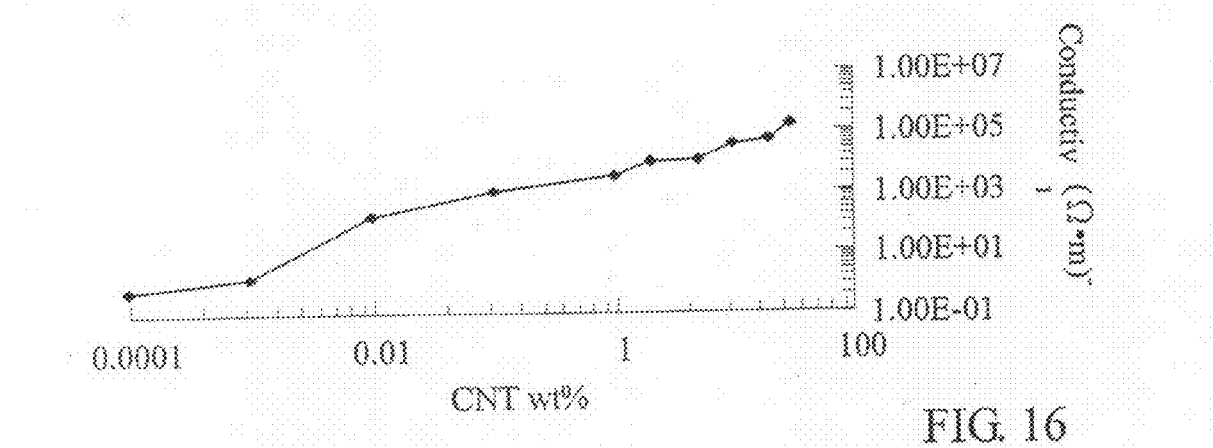
FIG. 16 illustrates conductivities of the CNT/PVA films.

Conductivities of the CNT/PVA films with different CNT contents obtained in Examples 10~15, 17, 19~21 are listed in Table 2 and shown in FIG. 16, which can be compared with conductivities of some metals and nonmetals as listed in Table 3.

TABLE 2

| Examples | CNT (wt %) | Conductivity (Ω · m)$^{-1}$ |
|---|---|---|
| 21 | 30 | 1,500,000 |
| 20 | 20 | 50,000 |
| 19 | 10 | 35,714 |
| 17 | 5 | 11,364 |
| 15 | 2 | 9,615 |
| 14 | 1 | 3,289 |
| 13 | 0.1 | 1,120 |
| 12 | 0.01 | 167 |
| 11 | 0.001 | 1.6 |
| 10 | 0.0001 | 0.65 |

TABLE 3

| Metal/alloy | Conductivity (Ω · m)$^{-1}$ | Nonmetal | Conductivity (Ω · m)$^{-1}$ |
|---|---|---|---|
| Ag | 6.3 × 10$^7$ | Ge | 2.2 |
| Cu$^a$ | 5.8 × 10$^7$ | Si | 4.3 × 10$^{-4}$ |
| AU | 4.2 × 10$^7$ | Polyethylene | 1 × 10$^{-14}$ |
| Al$^a$ | 3.4 × 10$^7$ | Polystyrene | 1 × 10$^{-14}$ |
|  |  | Diamond | 1 × 10$^{-14}$ |

$^a$commercial purity

Flame Retardant

Figure 17:
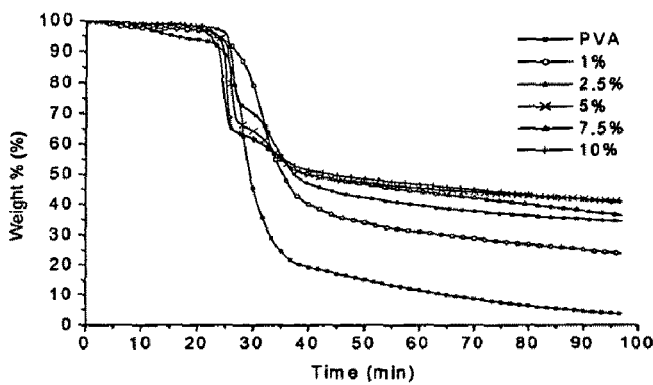
FIGS. 17~19 show the TGA curves of the CNT/PVA composite.
Figure 18:
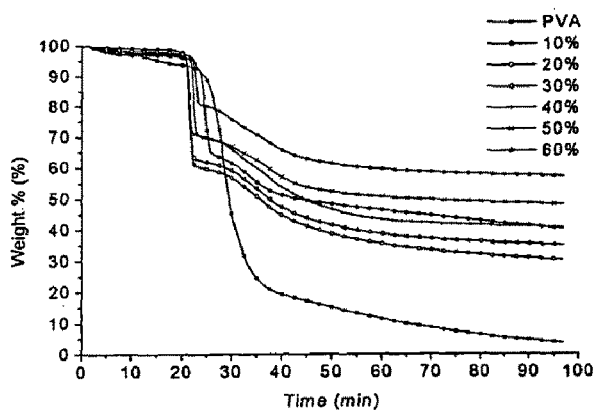
Figure 19:
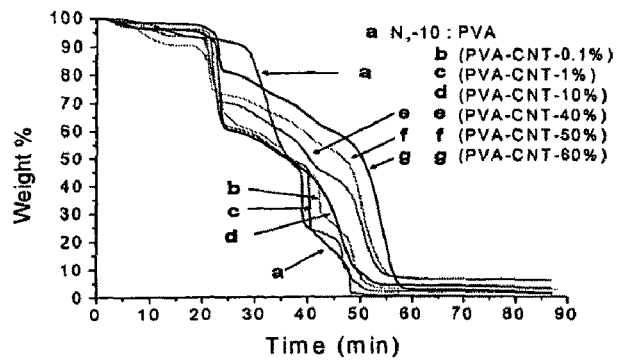

For unmodified PVA, thermal decomposition temperature (TDT) is 200° C. However, the CNT/PVA composite performs much higher TDT as shown in TGA curves of FIGS. 17~19. The temperature is increased at a gradient 10° C./min up to 900° C. and then kept for one hour. FIGS. 17 and 18 indicate that the composites with lower (0~10%) and higher (20~60%) CNT contents can effectively promote residuals at 400° C. FIG. 19 indicates that the composites with different CNT contents (0.1~60%) can also effectively promote residuals at 900° C.

Figure 20:
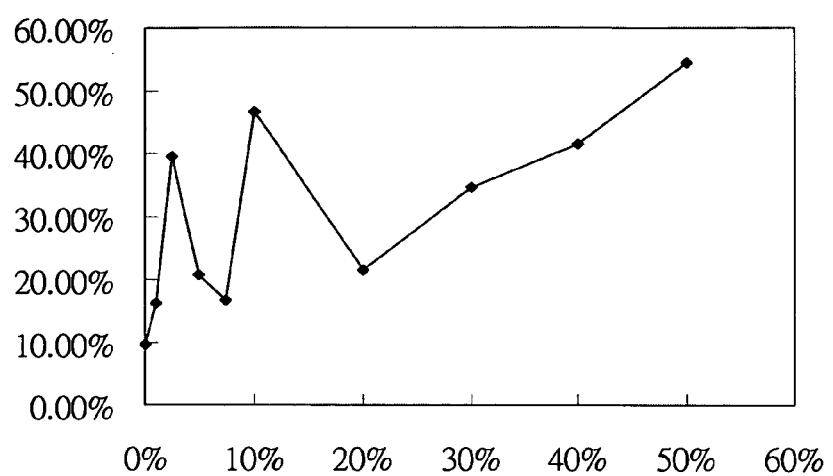
FIG. 20 shows final residuals of the CNT/PVA composites.

FIG. 20 shows final residuals of the CNT/PVA composites with different CNT contents obtained in Examples 14 & 16~23, and Table 4 lists these data. The temperature is increased at a gradients 2° C./min up to 400° C. then kept for one hour, and naturally cool down to room temperature.

TABLE 4

| Examples | CNT (wt %) | Residual (%) |
|---|---|---|
| — | 0 | 9.5 |
| 14 | 1.0 | 16.3 |
| 16 | 2.5 | 39.5 |
| 17 | 5.0 | 20.8 |
| 18 | 7.5 | 16.7 |
| 19 | 10 | 46.5 |
| 20 | 20 | 21.5 |
| 21 | 30 | 34.8 |
| 22 | 40 | 41.5 |
| 23 | 50 | 54.5 |

Figure 21:
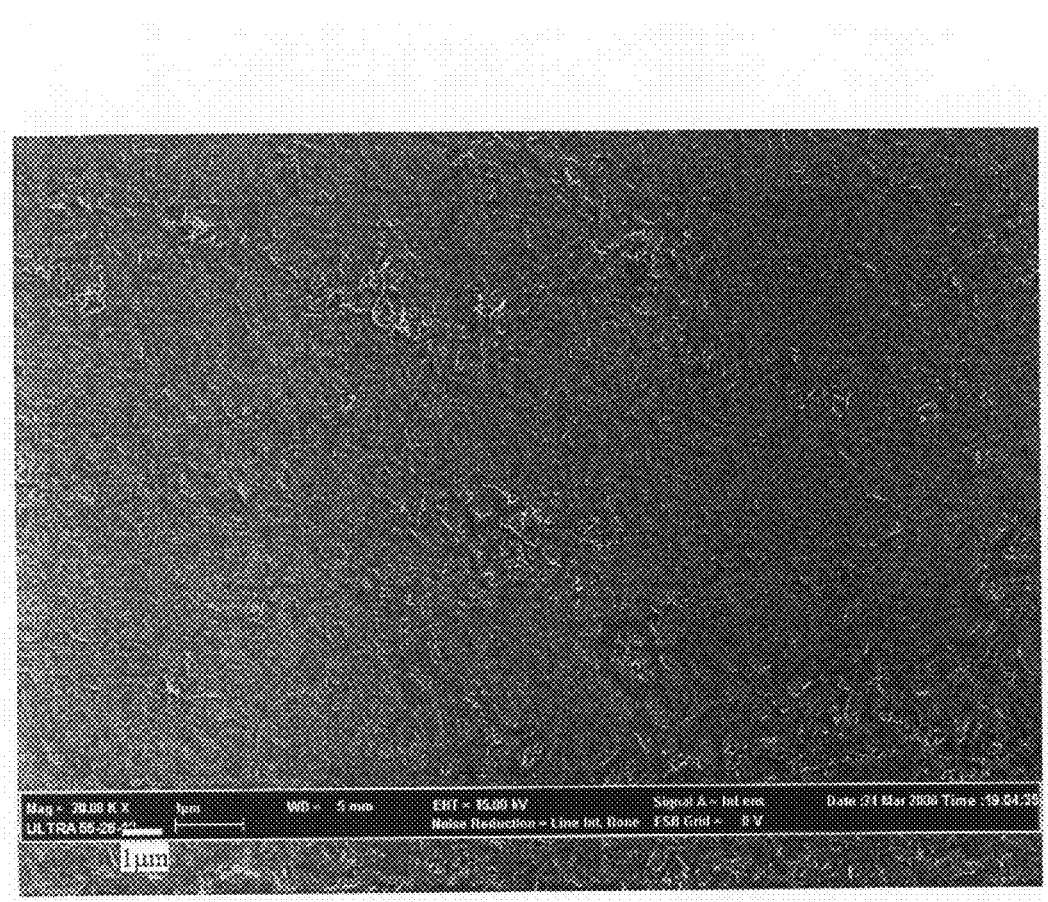
FIGS. 21 and 22 show SEM pictures of the burned CNT/PVA composite.
Figure 22:
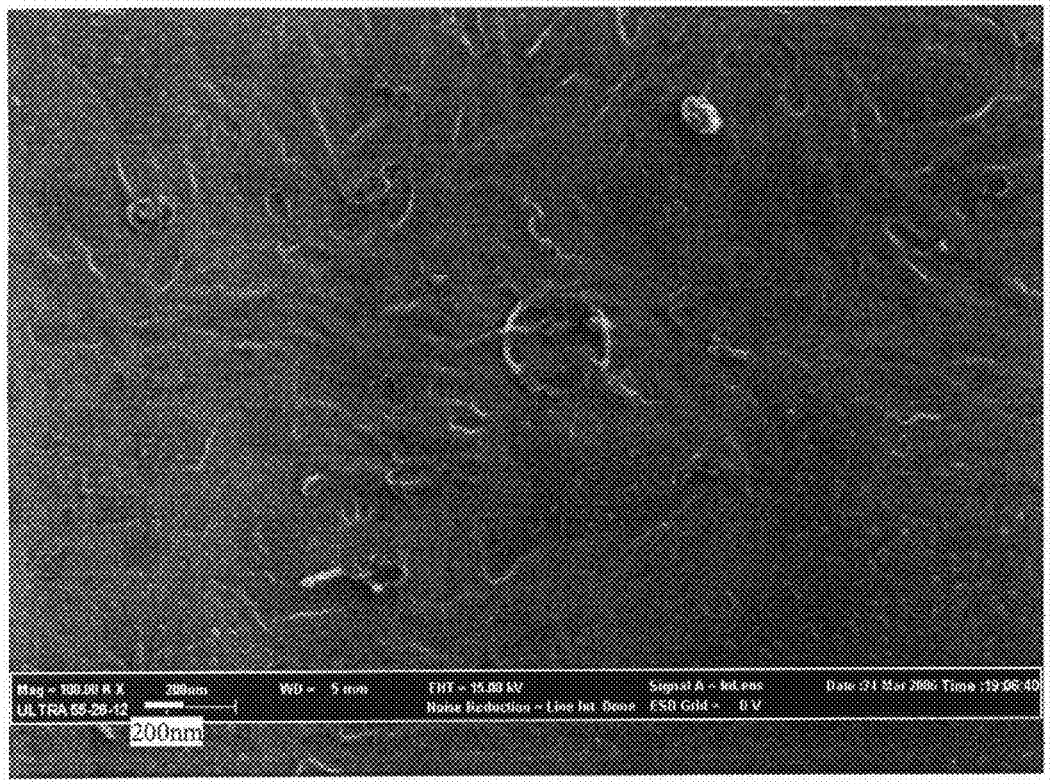

FIGS. 21 and 22 show SEM pictures of the burned CNT/PVA composite containing 5 wt % of CNT.

According to the above tests, it's obvious that the flame retardant of polymers can be effectively promoted when modified with CNT.

What is claimed is:

1. A method for producing a CNT/polymer composite, comprising steps of:
   mixing only CNT (carbon nanotubes) and a surfactant in water with a probe-type ultrasonic oscillator to form a CNT dispersion; and
   mixing only a polymer in the CNT dispersion with a probe-type ultrasonic oscillator;
   wherein the polymer is

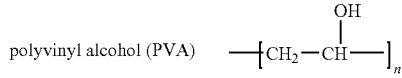

having molecular weight ranging 6,000 to 20,000 and the surfactant is sodium dodecyl sulfate (SDS); wherein n is an integer, the content of CNT ranges 20 to 50 wt %, the weight ratio of PVA:CNT ranges 0.8:1 to 3.75:1 and the weight ratio of SDS:CNT is 0.167:1 to 0.25:1.

2. The method of claim 1, further comprising a step:
   drying the CNT/polymer composite solution to obtain a solid CNT/polymer composite.

3. A CNT/polymer composite, comprising CNT (carbon nanotubes), sodium dodecyl sulfate (SDS) and

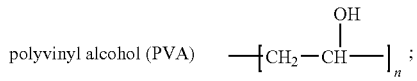

wherein PVA has molecular weight ranging 6,000 to 20,000, n is an integer, the content of CNT ranges 20 to 50 wt %, the weight ratio of PVA:CNT ranges 0.8:1 to 3.75:1 and the weight ratio of SDS:CNT is 0.167:1 to 0.25:1.

* * * * *